March 5, 1946. E. C. MYERS Re. 22,730

CABLE

Original Filed Dec. 30, 1935 3 Sheets-Sheet 1

Inventor

Edward C. Myers.

By Harold C. Thorne

Attorney

March 5, 1946. E. C. MYERS Re. 22,730

CABLE

Original Filed Dec. 30, 1935 3 Sheets-Sheet 2

Inventor

Edward C. Myers.

By Harold C. Thorne

Attorney

March 5, 1946. E. C. MYERS Re. 22,730

CABLE

Original Filed Dec. 30, 1935 3 Sheets-Sheet 3

Inventor

Edward C. Myers

By Harold C. Thorne

Attorney

Reissued Mar. 5, 1946

Re. 22,730

UNITED STATES PATENT OFFICE 22,730

CABLE

Edward C. Myers, Wilmette, Ill.

Original No. 2,326,719, dated August 10, 1943, Serial No. 56,793, December 30, 1935. Application for reissue September 21, 1943, Serial No. 503,300

24 Claims. (Cl. 305—10)

This invention relates to cables and more particularly to cables for rubber covered tracks for crawler type vehicles, conveyors and the like, belts, cables for elevators and other purposes where the cable is subject to flexing as in passing over sheaves.

This application is a continuation-in-part of my application for Rubber covered flexible tracks, Serial No. 588,722, filed January 25, 1932, which issued December 31, 1935, as Patent No. 2,025,999.

An object of this invention is to provide a rubber covered cable in which the cable is flexible, comprising a plurality of strands wherein each of the strands is made up of a plurality of wires so as to provide a flexible cable and a cable which will be highly resistant to elongation and wherein the rubber covering acts as a lubricant and thereby materially prolongs the life of the cable.

Another object of the invention is to provide a rubber covered cable in which the cable comprises a plurality of strands each consisting of a plurality of wires wherein the rubber covering extends into the cable and locks between the strands and also with the wires thereof wherein the outer strands are in tight engagement with the central stranded wire core of the cable. The cable is preferably constructed for this purpose with the outer strand lays in engagement with the central strand but spaced with respect to each other in a so-called "loose" lay; steel multi wire multi strand cables, this construction provides tensile strength without elongation and also flexibility.

A further object of the invention comprises the method of producing such rubber covered cables wherein a fluid compound of rubber is flowed under heat and vacuum into the cable so as to adhere to the metal wires thereof.

Another object of the invention is to provide a rubber covered cable for a rubber covered flexible track wherein the track is provided with cross anchor or drive members which are preferably rubber covered and between parts of which the rubber covered cables are secured.

Another object of the invention is to provide a rubber covered cable and rubber covered flexible tracks with driving members and guide members.

Another object of the invention is to provide such rubber covered cables in tracks, belts and the like which will provide longitudinal flexible members with a maximum lateral rigidity.

Another object of the invention is to provide belts and the like incorporating rubber covered cables which will have high tensile strength with minimum elongation for power transmission and which will operate at high speeds.

Another object of the invention is to provide such rubber covered cables which are particularly adaptable for various applications such as in belts, tracks, conveyors and the like and in their use provide for insulation between the steel cable members and members with which their exterior surface or the surface of a body member compounded therearound will provide an insulating means with respect to cooperating members such as sheaves when applied in belts or metallic cross members as in the rubber covered track and belt construction and cross members of conveyors.

Further objects, features and advantages of my invention will be set forth in detail in the following specification in conjunction with the accompanying drawings and as hereinafter claimed.

Figure 1:
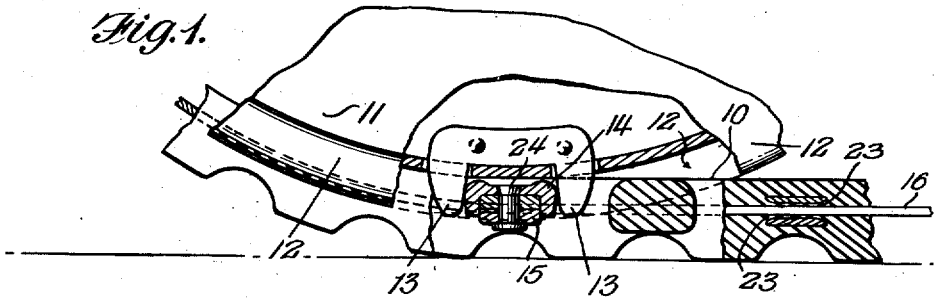
Figure 1 is a side elevation partly in section showing a portion of a track employing rubber covered cables in accordance with my invention.
Figure 2:
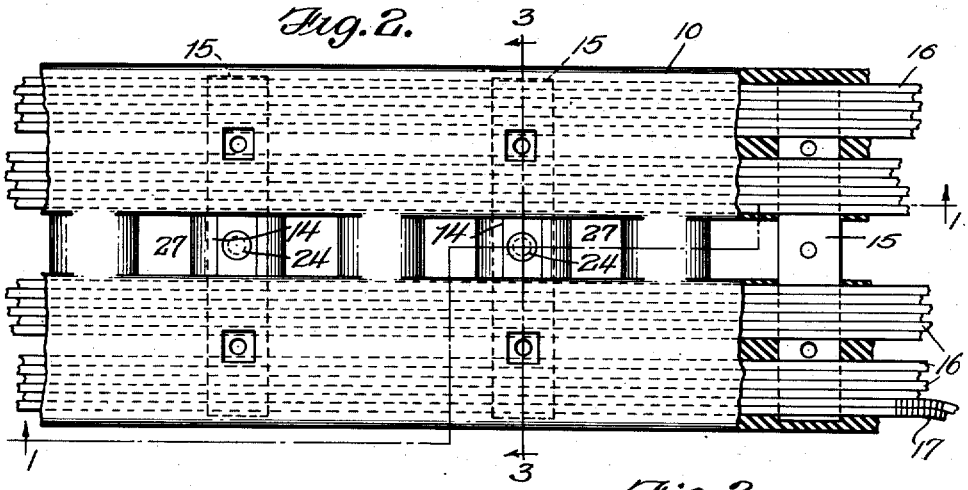
Figure 2 is an inner plan view thereof partly in section.
Figure 3:
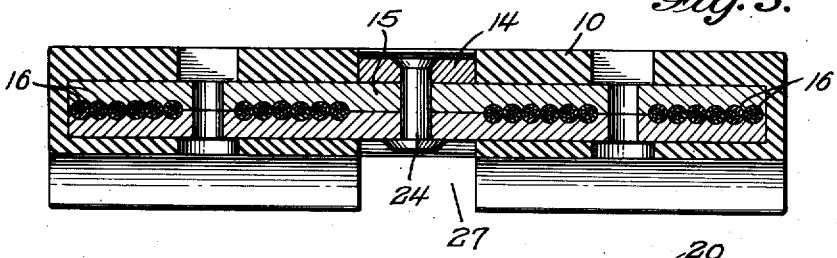
Figure 3 is a transverse section taken on line 3—3 of Figure 2.

Referring to Figures 1, 2 and 3 of the drawings, a portion of an endless rubber covered flexible track 10 is shown mounted on a driving or driven wheel 11 of a tractor drive wherein the rim of the wheel is provided with inner and outer side flanges 12 which engage the sides of track 10 and teeth 13 at intermediate positions between flanges 12 which engage intermediate driving members 14 mounted on cross or anchor members 15 within the body of the track so that the driving of the track is along the midway position thereof and in line with or substantially in line with cable members 16.

Cables 16 which are rubber covered as hereinafter set forth are preferably wound around forms so as to obtain the required length of the track with the end of a cable secured, as for example by taping it to an adjacent turn as indicated at 17 in Figure 2 so as to maintain it in place until the track tread body rubber is vulcanized to the parts and the winding is continued until the required number of turns for the track are obtained when the various ends of the cables are simultaneously secured in place.

Figure 5:
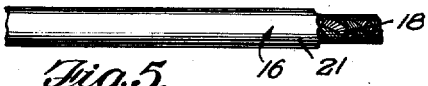
Figure 5 is a longitudinal detail view partly in section of the cable member.
Figure 4:
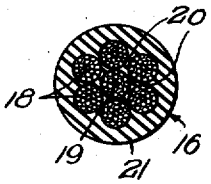
Figure 4 is an enlarged transverse sectional view of one of the cable members.

Cable 16 as shown in Figures 4 and 5 consists of a plurality of strands 18 surrounding a central strand 19 and each strand is formed of a plurality of metal wires preferably steel so as to provide a cable having a high tensile strength yet flexible and adapted for use in such rubber covered tracks, belts, elevator cables and general purposes. As shown, the cable is preferably formed with the outer strands tightly engaging the inner strand but slightly spaced from each other in a manner which will be termed loose lay. These spaces 20 permit rubber to flow in around the outer strands to provide an additional lock for the rubber covering 21 as shown in Figures 4 and 5.

The cable is necessarily cleared of impurity such as dirt, oil and the like before the rubber covering is added and the spaces 20 allow the rubber to flow around the strands to form a lock for the rubber covering in addition to the outer covering thereof. In covering the cables, a fluid or rubber compound is impregnated into the cable under heat and in a vacuum so that the air will be withdrawn and the rubber will impregnate the cable entering the spaces to the central strand and to some extent between the individual wires of the strands so as to lock therewith for holding in addition to the adhesion to the metal. By this coating process, the adhesion is assured and when such rubber covered cables are employed in tracks or belts this pre-coating with the fluid type rubber will readily adhere to the rubber used in the tread of the track or belt surface. After this covering and impregnating of the cables with fluid rubber, the covering may be vulcanized or when used in tracks or belts and this precoating is thin, it has been found that it will receive the required vulcanizing when the main tread body rubber is vulcanized.

On cables 16 at intervals corresponding with the spaces of the teeth on the driving or driven wheels 11 are mounted anchor members 15 which are also given a pre-coating of rubber or rubber compound in a manner to closely adhere thereto. These driving members as shown in Figures 1 and 2 have their faces adjacent to the rubber covered cables curved to provide spaces 23 for rubber cushions between their edges and the cables which is particularly important when the track is in a bent position as it passes over the curved rim of the wheels 11. These cross members are clamped on the cables by means of rivets, bolts or the like 24 and the drive between them and the cables is through the rubber coverings of the members and the tread rubber. While these cross members may constitute the driving members for direct engagement with the driving teeth, they are preferably provided with intermediate drive members 14 mounted on them and secured in place by means of rivets or the like 24 so that when worn they may be replaced or exchanged for other forms of intermediate drive members.

After assembling the cables and cross members thereon the body rubber which is a rubber compound suitable for tread or belting surfaces is forced and molded into place over the assembly being formed so as to provide a series of apertures 27 centrally of the track and is vulcanized to the required degree and in this vulcanization process the body rubber readily combines with the rubber covering of the cables and cross members. It will be noted that this central series of apertures 27 provide openings through which the drive teeth project for engagement with the driving members and also through which dirt passes.

The manner in which the drive members are spaced along the cables so as to accurately engage with the teeth of the wheels has been fully disclosed in my prior application hereinbefore referred to; likewise the construction of the track and various other modifications of the cross members and intermediate drive members have also been disclosed therein and the function of the parts as well as their construction fully described.

Figure 6:
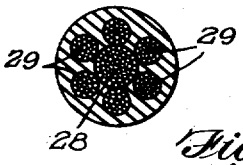
Figures 6 and 7 are transverse sectional views similar to Figure 4 further illustrating the rubber covered cables.
Figure 7:
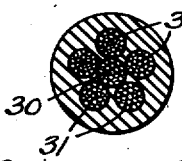

Figures 6 and 7 illustrate forms of the cable members similar to that shown in Figure 4. In accordance with Figure 6 the central strand or core strand 28 is spirally wound steel wire and of a larger diameter than the outer strands 29 which are likewise spirally wound steel wires. In Figure 7 the inner strand 30 and the outer strands 31 are similarly spirally wound steel wires and the strands are substantially the same size. These cables are exaggerated to illustrate the position occupied by the rubber. The space between the outer strands is very small on small diameter cables such as are used in the track for moderate size tractors. In this instance, the cables are $\frac{5}{32}''$ in diameter and in order to give the track a high degree of longitudinal flexibility the required tensile strength is obtained by employing a number of turns of the cable arranged side by side along the pitch driving line of the track as illustrated. This arrangement also increases the lateral rigidity of the track. In such small cables it is difficult to detect the difference between the standard cable and one with the special wide spacing between the strands. Various types of steel cables are made with varying "closeness" to fit between the strands in heavy cables, however it is impractical to have strands set too close to each other due to having a stiffening effect on the finished cable.

Figure 8:
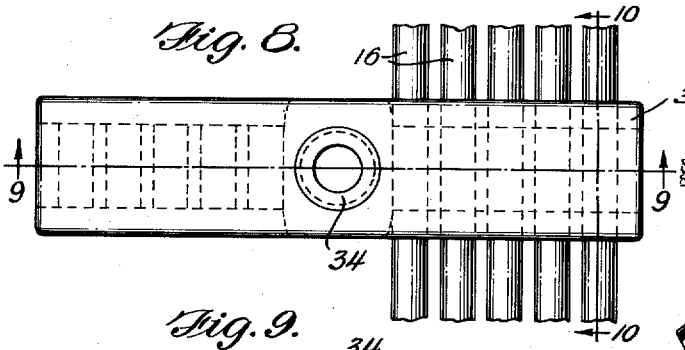
Figure 8 is a plan view showing a modified driving or anchor cross member showing the manner of applying the rubber covered cables thereto.
Figure 10:
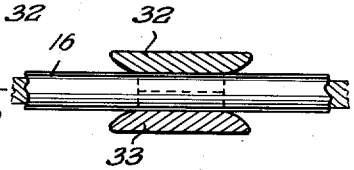
Figure 10 is a sectional view thereof taken on line 10—10 of Figure 8.
Figure 9:
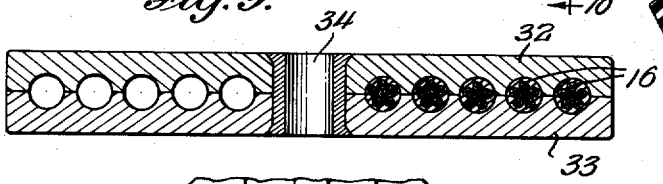
Figure 9 is a sectional view thereof taken on line 9—9 of Figure 8.

In the application of the cables to a track, Figures 8, 9 and 10 show the cables positioned in a modified type of cross members 32 and 33 which grip a plurality of such cables 16, five being shown in position and the cross members being held together by a hollow rivet 34 threaded for receiving bolts which hold wear plates, guides, traction cleats, slats and the like. In this modification, it will be noted that the rubber covered cable supplies the insulation at the fastening points, the rubber covering of the cable being in contact therewith and also with the edge portions of the cross members which diverge from the cable in the lengthwise direction thereof.

Figure 11:
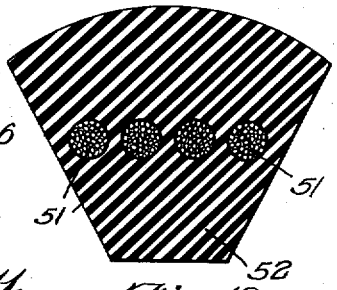
Figure 11 is a fragmentary cross sectional view of a modified form of the track showing a portion of a drive wheel.
Figure 12:
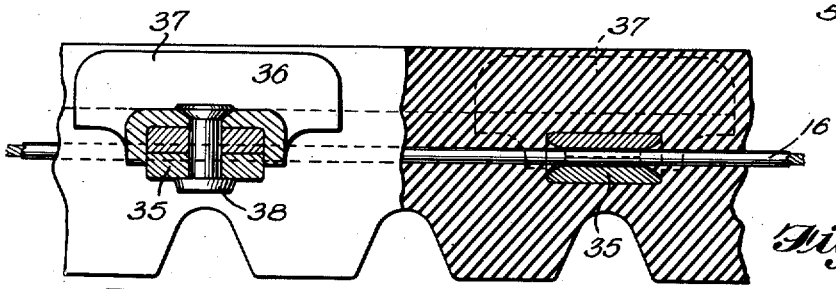
Figure 12 is a side view of the track shown in Figure 11 partly in longitudinal section.
Figure 15:
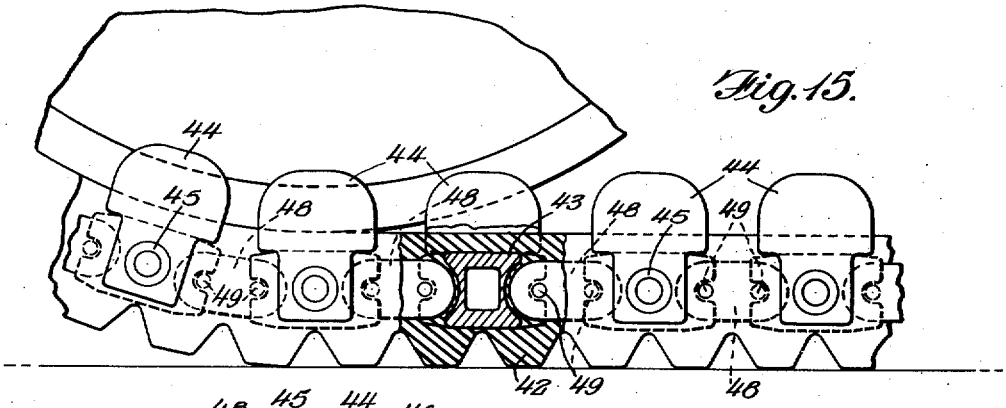
Figure 15 is a side elevation thereof partly in section.
Figure 13:
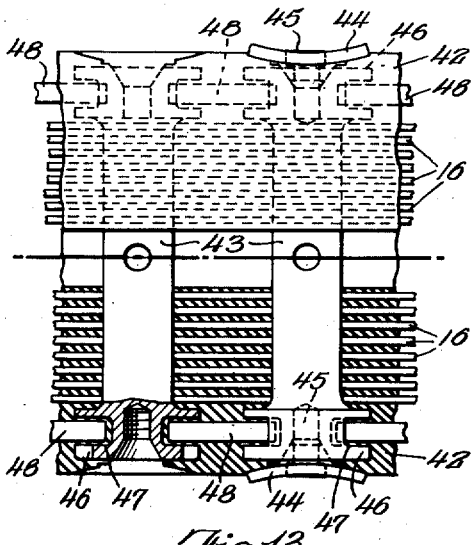
Figure 13 is a detailed view partly in plan showing a further modified form of the track which like Figures 11 and 12 illustrates guide plates.
Figure 14:
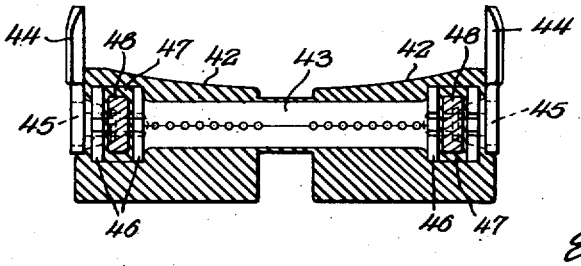
Figure 14 is a transverse sectional view thereof.

Figures 11 and 12 and 13, 14 and 15 show further modified forms of such tracks in which the rubber covered flexible cables provide the tensile strength for the track. In Figures 11 and 12 the anchor members 35 are provided with combined intermediate drive members 36 and guide members 37 secured thereto by bolts or rivets 38. The drive wheel 39 is provided with a flange 40 which cooperates with the central series of guide plates 37 and teeth 41 extending therefrom which engage the tooth contacting surface of the intermediate driving members. In Figures 13, 14 and 15 tread body sections 42 are mounted on cross members 43 in which the cables 16 are secured and at the outer ends of these cross members are guides 44 which are secured by bolts 45 thereto. These guide members engage the sides of the driving wheel rim and maintain the track in place in a similar manner as the central guides shown in Figures 11 and 12. In addition to the guide members the ends of the cross members 43 are provided with projections 46 having sockets 47 therein which cooperate with cross driving member aligners 48. These aligners as shown are completely surrounded by rubber and thus do not act to limit the longitudinal flexing of the track. These aligning members are rubber coated, these members being provided with sufficient rubber to prevent metal to metal contact and wear. The aligners may also be provided with dowel pins 49 either of soft metal or hard rubber which cooperates with the projections 46 for holding the aligners centrally with respect to the sockets 47 while molding the tread rubber.

Figure 18:
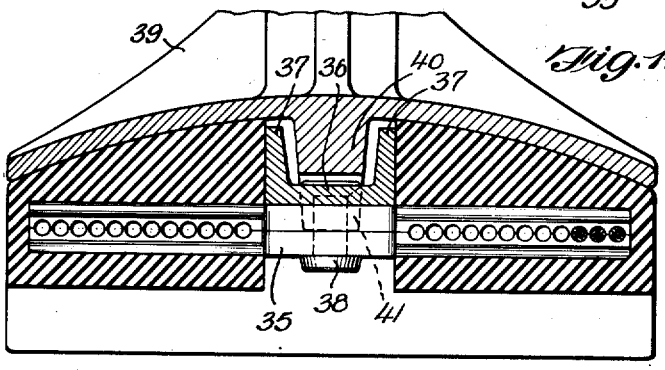
Figures 17 and 18 are transverse sectional views of V belts including the cables.
Figure 17:
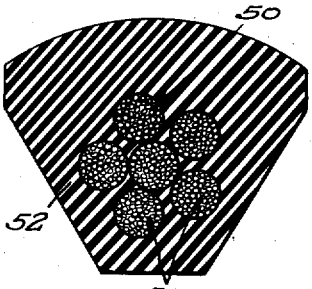
Figure 16:
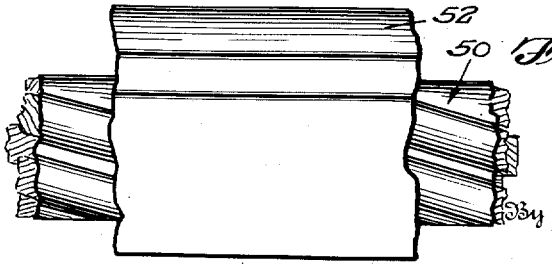
Figure 16 is a fragmentary section showing the application of the rubber covered cables in belts.

The cables 16 are particularly adapted for belts and in their application thereto Figures 16, 17 and 18 illustrate V belts for power transmission. In Figures 16 and 17 one large rubber covered cable 50 is illustrated while in Figure 18 a plurality of cables 51 arranged laterally are shown. In these belts the pre-covered steel cables are positioned as nearly as possible along the effective pitch driving line; in fact, the cable members determine the pitch line of the drive and should be positioned accordingly in the body rubber 52 vulcanized around them.

These belts stand extreme tension and operate at high speeds for power transmission and will operate over comparatively small sheaves. This results in flexing which requires great adhesion qualities in the entire construction. The construction of the belts permits the transmission of the power which would be impossible with previous types of fabric rubber belt constructions which have been used in numerous machines for transmitting low power due to their very limited tensile strength. These rubber covered cables are likewise applicable to belts of flat construction or of round cross section and are suitable for elevator cables and the like.

Figure 19:
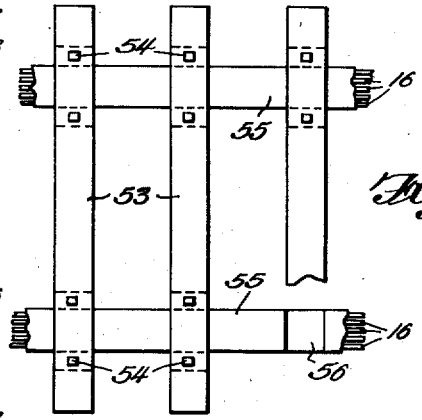
Figure 19 is a plan view showing a further application of the rubber covered cable members to slat type conveyors.
Figure 20:
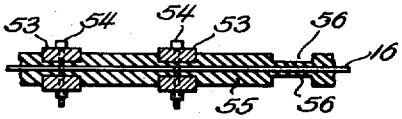
Figure 20 is a side elevation thereof.

Figures 19 and 20 illustrate a further application of the cable construction as applied to special products such as a slat type conveyor as illustrated. In this arrangement the cross members or slats 53 are clamped by means of bolts or the like 54 to the tensioning members 55. In this arrangement of the cable tensioning members each has a plurality of rubber covered cable members 16 arranged laterally and embedded in the body rubber covering designated 56 as the finished tensioning members which are vulcanized to the cables. As best shown in Figure 20, the body may be slotted as indicated at 56 to provide seats for the slats 53. This conveyor construction is made in the form of an endless belt and the sprocket teeth drive it through, properly shaping the contact points of the slats in a similar manner to the track drive arrangement. This construction provides many advantages over such chain constructions, among others being its flexibility and strength and capability of operating at much greater speeds.

It will be noted that in each of the applications employing this cable the adhesion of the rubber to the strands of the flexible steel cable is an essential feature and the body material applied over the cables must likewise combine with the rubber covering on the cables. The character of this body material may vary in accordance with the application since in vehicle endless track treads the body must necessarily be of suitable composition for that purpose and in other applications as in belts it may be similar thereto. In belts the body may include laminated fabric incorporating the cables and likewise in tread bodies within the scope of this invention.

Several embodiments illustrating my invention having been described, it is apparent that variations in form may be made within the spirit of my invention and the scope of the claims.

I claim:

1. A flexible band track for track laying tractors and the like including rubber covered flexible metal tensioning members, rubber covered cross members at intervals therealong, tread body rubber encasing and adhering to the surface of the rubber covered metal members, intermediate driving members on said cross members, and guides for cooperating with the tractor drive wheel secured to the ends of said cross members.

2. A flexible band track for track laying tractors and the like including rubber covered flexible metal tensioning members, rubber covered cross members at intervals therealong, tread body rubber encasing and adhering to the surface of the rubber covered metal members, guides for cooperating with the tractor drive wheel on said cross members, sockets on the ends of said cross members, and aligners extending into said sockets and interconnecting the ends of successive cross members.

3. A flexible member for tracks, belts and the like comprising a rubber impregnated and covered flexible steel wire cable and a body of rubber in which said rubber covered cable is embedded and with the rubber cover of which said body rubber unites, said body rubber having a conformation for cooperating with tractor wheels, pulleys and the like as an endless track or belt therefor and wherein the cable is located at the pitch drive line of the rubber body in which it is embedded.

4. A flexible member for tracks, belts and the like comprising a plurality of rubber impregnated and covered stranded wire cables extending longitudinally in a common plane and in substantially parallel relationship with respect to each other and a body compound of rubber in which said rubber covered cables are embedded and with which the outer rubber covering on the cables combines, and wherein the cables are positioned along the pitch drive line of the belt.

5. In a track or the like adapted to travel over driving or driven wheels of the type having endwise curved driving faces, a tensioning element comprising at least a pair of parallel longitudinally extending rubber impregnated and covered wire cables, rubber covered anchor members extending crosswise of said tensioning element at spaced intervals along said tensioning element, a body of rubber in which said rubber covered cable and anchor members are embedded and with which the body of rubber unites, said body having a curved surface that coincides with the driving face of the wheel and a ground engaging surface, a track driving member supported by each of said anchor members, and a track guide for each of said anchor members.

6. In a track or the like adapted to travel over driving or driven wheels of the type having endwise curved driving faces, a tensioning element comprising a plurality of rubber impregnated and covered wire cables extending longitudinally in a common plane and in substantially parallel relationship with respect to each other, rubber covered anchor members extending crosswise of said tensioning element at spaced intervals along said tensioning element, a body of rubber in which said rubber covered cable and anchor members are embedded and with which the body of rubber unites, said body having a curved surface that coincides with the curved driving face of the wheel, a track driving member supported by each of said anchor members, and a track guide for each of said anchor members.

7. In a track or the like adapted to travel over driving or driven wheels of the type having endwise curved driving faces, a tensioning element comprising a plurality of rubber impregnated and covered wire cables extending longitudinally in a common plane and in substantially parallel relationship with respect to each other, rubber covered anchor members extending crosswise of said tensioning element at spaced intervals along said tensioning element, a body of rubber in which said rubber covered cable and anchor members are embedded and with which the body of rubber unites, said body having a curved surface that coincides with the curved driving face of the wheel, a wear plate member removably secured to each of said anchor members, adapted to engage a sprocket wheel to impart movement to the track, and guide lugs cooperating with said wear plates.

8. In a track or the like adapted to travel over driving or driven wheels of the type having endwise curved driving faces, a plurality of longitudinally extending rubber impregnated and covered flexible wire cables, rubber covered cross members in clamping engagement with said longitudinally extending rubber impregnated and covered flexible wire cables at spaced intervals along said cables, a body of rubber in which said rubber covered cable and rubber covered cross members are embedded and with which the body of rubber unites, said body having a curved surface that coincides with the driving face of the wheel, a track driving member carried by each of said cross members, and a track guide for each of said cross members.

9. In a track or the like adapted to travel over driving or driven wheels of the type having endwise curved driving faces, a tensioning element comprising a plurality of parallel longitudinally extending rubber covered wire cables, rubber covered cross members provided at spaced intervals along said tensioning element, a body of rubber in which said rubber covered cable and cross members are embedded and with which the body of rubber unites, said body having a curved surface that coincides with the driving face of the wheel, a track driving element secured to each of said cross members, and a track guide element extending from said track driving element toward the curved driving face of the wheel.

10. In a track or the like adapted to travel over driving or driven wheels of the type having endwise curved driving faces, a tensioning element comprising parallel longitudinally extending rubber impregnated and rubber covered flexible wire cables, rubber covered cross members in clamping engagement with said cables at spaced intervals therealong, a track driving element secured to each of said cross members and a track guide member extending from each of said track driving elements toward the driving face of the wheel.

11. A conveyor belt comprising a plurality of rubber impregnated and covered flexible wire cables extending longitudinally of the belt in substantially parallel relationship with respect to each other, and a body of rubber in which said cables are embedded and with which the rubber cover of the cables are united, said rubber body having a conformation for cooperating with a rotating surface, said cables being disposed with their axes substantially in the neutral axis of the belt.

12. A conveyor belt comprising a flexible rubber body having a conformation for cooperating with a rotating surface and a plurality of rubber impregnated and covered flexible wire cables embedded in the rubber body and having the rubber cover thereon united with the rubber of said body, said cables extending longitudinally of the belt and disposed with their axes in a plane passing through the neutral axis of the belt, and rubber covered members associated with said body extending transversely to said cables.

13. A conveyor belt comprising a plurality of substantially endless rubber bodies, a plurality of rubber impregnated and covered flexible wire cables embedded in and extending longitudinally of each of said rubber bodies in substantial parallel relationship with respect to each other, the rubber covering on said cables being united with the rubber bodies in which the cables are embedded, and members connecting said rubber bodies and extending transversely of the same.

14. A flexible band track for track laying vehicles comprising flexible metal tensioning members, cross members at intervals therealong, tread body rubber encasing and adhering to the surfaces of the metal tensioning members and to the surfaces of the cross members and lying between adjacent surfaces of the cross members and the tensioning members, said cross members being formed of pairs of cooperating plates having formed between the same channels for receiving the tensioning members.

15. A flexible band track for track laying vehicles comprising flexible metal tensioning members, cross members at intervals therealong, tread body rubber encasing and adhering to the surfaces of the metal tensioning members and to the surfaces of the cross members and lying between adjacent surfaces of the cross members and the tensioning members, said cross members being formed of pairs of cooperating plates having formed between the same channels for receiving the tensioning members, the cross members having curved portions at the ends of the channels to increase the spacing between the same and the tensioning members for the reception of rubber to provide cushions for the tensioning members.

16. A flexible band track for track laying vehicles comprising rubber covered flexible metal tensioning members, rubber covered cross members at intervals therealong, tread body rubber encasing and adhering to the surfaces of the rubber covered metal members, said cross members being formed of pairs of cooperating plates having grooves intermediate the ends thereof for receiving and embracing the cables, the cross members having portions at the ends of the grooves shaped to increase the spacing between the same and the tensioning members for the reception of rubber to provide cushions for the tensioning members.

17. A flexible band track for track laying vehicles comprising flexible metal tensioning members, cross members at intervals therealong, tread body rubber encasing and adhering to the surfaces of the tensioning members and cross members and lying between adjacent surfaces of said tensioning members and cross members, said cross members being formed of plates having grooves for receiving the tensioning members with the walls of the grooves shaped at the ends thereof to provide convex surfaces increasing the spacing between the edges of the cross members at the ends of the grooves and the tensioning members.

18. A flexible band track for track laying vehicles comprising flexible metal tensioning members, cross members at intervals therealong, tread body rubber encasing and adhering to the surfaces of the tensioning members and cross members and lying between adjacent surfaces of said tensioning members and cross members, said cross members being formed of cooperating pairs of plates each having semi-cylindrical grooves provided therein for reception of the tensioning members and means for clamping said plates together with the grooves in one plate registering with those in the other.

19. A flexible band track for track laying vehicles comprising flexible metal tensioning members, cross members at intervals therealong, tread body rubber encasing and adhering to the surfaces of the tensioning members and cross members and lying between adjacent surfaces of said tensioning members and cross members, said cross members being formed of cooperating pairs of plates each having semi-cylindrical grooves provided therein for reception of the tensioning members and means for clamping said plates together with the grooves in one plate registering with those in the other, the edges of said plates at the ends of the grooves being shaped to increase the spacing between the plates at the ends of the grooves and the tensioning members for the reception of rubber to form cushioning elements between the tensioning members and the plates at the ends of the grooves.

20. A flexible band track for track laying vehicles comprising flexible metal tensioning members, cross members at intervals therealong, tread body rubber encasing and adhering to the surfaces of the tensioning members and cross members, intermediate driving members on said cross members, and laterally spaced upstanding guide flanges carried by said intermediate driving members at each side thereof for cooperating with track carrying wheels of the vehicle.

21. A flexible band track for track laying vehicles comprising rubber covered flexible metal tensioning members, rubber covered cross members at intervals therealong, tread body rubber encasing and adhering to the surfaces of the rubber covered tensioning members and cross members, intermediate driving members on said cross members, and guides carried by said intermediate driving members for cooperating with track carrying wheels of said vehicle.

22. A flexible band track for track laying vehicles comprising rubber covered flexible metal tensioning members, rubber covered cross members at intervals therealong, tread body rubber encasing and adhering to the surfaces of the rubber covered tensioning members and cross members, removable driving members on said cross members intermediate the ends thereof, and laterally spaced guides carried by said removable driving members for cooperating with track carrying wheels of said vehicle.

23. A flexible band track for track laying vehicles comprising rubber covered flexible metal tensioning members, rubber covered cross members at intervals therealong, tread body rubber encasing and adhering to the surface of the rubber covered tensioning members and cross members, and combined intermediate driving members and guides on said cross members, said driving members and guides having one U-shaped portion for embracing the cross members and an oppositely disposed U-shaped portion forming wheel engaging guides.

24. A flexible band track for track laying vehicles comprising rubber covered flexible metal tensioning members, rubber covered cross members at intervals therealong, tread body rubber encasing and adhering to the surface of the rubber covered tensioning members and cross members, and combined intermediate driving members and guides on said cross members, each of said combined intermediate driving members and guides being in the form of a plate-like member for engaging a cross member with flanges extending therefrom on each side of the cross member for embracing the latter and with flanges extending in the opposite direction therefrom to serve as guides for cooperating with track carrying wheels of the vehicle, and means for securing said combined intermediate driving members and guides to said cross members.

EDWARD C. MYERS.